(12) United States Patent
Satou

(10) Patent No.: US 8,172,055 B2
(45) Date of Patent: May 8, 2012

(54) ONE-WAY CLUTCH

(75) Inventor: Chiyori Satou, Kuwana (JP)

(73) Assignee: NTN Corporation, Osaka (JP)

( * ) Notice: Subject to any disclaimer, the term of this patent is extended or adjusted under 35 U.S.C. 154(b) by 514 days.

(21) Appl. No.: 12/413,652

(22) Filed: Mar. 30, 2009

(65) Prior Publication Data

US 2009/0242347 A1 Oct. 1, 2009

(30) Foreign Application Priority Data

Mar. 31, 2008 (JP) ................. 2008-090272

(51) Int. Cl.
*F16D 41/066* (2006.01)
*F16D 3/14* (2006.01)
(52) U.S. Cl. ............ 192/45; 192/55.3; 192/209
(58) Field of Classification Search .......... 192/45, 192/55.3, 207, 209
See application file for complete search history.

(56) References Cited

U.S. PATENT DOCUMENTS

| 4,660,698 A * | 4/1987 | Miura ............... 192/45 |
| 4,949,824 A * | 8/1990 | Buckley et al. .......... 192/45 |
| 5,271,486 A * | 12/1993 | Okamoto et al. ........ 192/45 |
| 5,672,110 A * | 9/1997 | Kurita et al. .......... 464/37 |
| 6,186,298 B1 * | 2/2001 | Wake ............... 192/38 |
| 6,454,069 B2 * | 9/2002 | Oh .................. 192/45 |

FOREIGN PATENT DOCUMENTS

| JP | 3270667 | 4/2002 |
| JP | 2007-139198 | 6/2007 |
| JP | 2007-263216 | 10/2007 |

OTHER PUBLICATIONS

Japanese Office Action issued Feb. 28, 2012 (with partial English translation) in a Japanese application that is a foreign counterpart to the present application.

* cited by examiner

*Primary Examiner* — David D Le
*Assistant Examiner* — Jacob S Scott
(74) *Attorney, Agent, or Firm* — Wenderoth, Lind & Ponack, L.L.P.

(57) ABSTRACT

A one-way clutch is proposed which includes an outer race having a radially inner surface in which a plurality of pockets are formed. Rollers are each received in one of the pockets. Wedge-shaped spaces are defined between respective cam surfaces of the pockets and a shaft inserted through the outer race. When the shaft rotates in one direction, the rollers are wedged into the narrow ends of the respective wedge-shaped spaces, thereby locking the clutch. When the shaft rotates in the opposite direction, the rollers move toward the wide ends of the wedge-shaped spaces, thereby unlocking the clutch. The casing includes a main body and a cylindrical member fitted in the main body and made of an elastic synthetic resin. The outer race is fitted in the cylindrical member.

1 Claim, 4 Drawing Sheets

ONE-WAY CLUTCH

BACKGROUND OF THE INVENTION

This invention relates to a one-way clutch used in driving units such as paper feed units of printers and copiers.

Typical conventional one-way clutches used in office machines such as printers and copiers comprise an outer race formed with a plurality of pockets in the radially inner surface thereof so as to be circumferentially spaced apart from each other. Cam surfaces are formed on the radially outer surfaces of the respective pockets. The cam surfaces are inclined in the same circumferential direction to define wedge-shaped spaces having a wedge angle in the respective pockets. In each pocket, a roller and a spring biasing the roller toward the narrow end of the wedge-shaped pocket are received. The outer race is received in a cylindrical casing having an open end and a closed opposite end with the open end closed by a lid (as disclosed in JP Patent Publication 3270667B).

A shaft extends through the lid, the outer race and the closed end of the casing, and is supported by the radially inner surface of the outer race. When the shaft rotates toward the narrow ends of the respective wedge-shaped spaces, the rollers are wedged into the narrow ends of the respective wedge-shaped pockets, thereby transmitting torque from the shaft to the outer race and the casing. When the shaft rotates in the opposite direction, the rollers move toward the wide ends of the respective wedge-shaped pockets, thereby disengaging the shaft from the outer race, allowing free rotation of the shaft.

When the shaft rotates toward the narrow ends of the respective wedge-shaped pockets, the rollers abut against and are wedged between the respective cam surfaces and the outer periphery of the shaft, thereby locking the clutch. When the rollers abut against the cam surfaces and the outer periphery of the shaft, impulsive pushing force is produced which tends to radially outwardly displace the portions of the outer race located radially outwardly of the respective cam surfaces and also radially inwardly press the outer periphery of the shaft.

But since the outer race is fitted in the casing of the one-way clutch without play to ensure rigidity of the clutch, the portions of the outer race located radially outwardly of the cam surfaces can be scarcely displaced radially outwardly, which in turn makes it difficult to effectively reduce (absorb) the impulsive pushing force applied from the rollers.

The pushing force is thus almost entirely applied to the outer periphery of the shaft. Because this one-way clutch is used in office machines, the shaft is ordinarily not hardened and is thus low in hardness. Thus, when impulsive pushing force is applied to the shaft, impressions and/or fretting wear tend to develop on the outer periphery of the shaft. If such wear progresses, gaps may develop between the respective rollers and the outer periphery of the shaft when the clutch is locked, thereby making it difficult to keep the clutch locked.

An object of the present invention is to minimize wear of the shaft by the rollers when the clutch is locked.

SUMMARY OF THE INVENTION

In order to achieve this object, the present invention provides a one-way clutch comprising a cylindrical casing, an outer race inserted in the casing and having a radially inner surface in which a plurality of equiangularly spaced pockets are formed, rollers each received in one of the pockets, a shaft inserted through the radially inner surface of the outer race, the pockets having cam surfaces that are inclined in the same rotational direction, thereby defining wedge-shaped spaces having narrow and wide circumferential ends between the respective cam surfaces and the shaft, and springs each received in one of the pockets and biasing the respective rollers toward the narrow circumferential ends of the respective wedge-shaped spaces, wherein the casing is made of a synthetic resin, and includes a shock absorbing mechanism for absorbing shocks produced when the shaft and the outer race rotate relative to each other in one direction and the rollers are wedged between the respective cam surfaces and the outer periphery of the shaft.

In one arrangement, the shock absorbing mechanism comprises a radially inner elastic portion of the casing.

With this arrangement, because the radially inner portion of the casing, which is made of a synthetic resin, has elasticity, this portion is elastically and radially outwardly deformable. Thus, when the clutch is locked, that is, when the shaft and the outer race rotate relative to each other in one direction and the rollers are wedged between the cam surfaces of the pockets of the outer race and the outer periphery of the shaft, the radially outer portions of the outer race located radially outwardly of the cam surfaces are radially outwardly displaced under pushing force applied from the rollers to the cam surfaces, while elastically deforming the radially inner portion of the casing. The radially inner portion of the casing thus absorbs the pushing force applied to the rollers. This reduces the pushing force applied to the outer periphery of the shaft, thereby reducing wear of the outer periphery of the shaft.

The casing may comprise a cylindrical main body and a cylindrical member made of an elastic synthetic resin and fixedly fitted in the cylindrical main body. In this case, the cylindrical member constitutes the radially inner elastic portion of the casing.

In this arrangement, because the cylindrical member as the radially inner portion of the casing is made of an elastic synthetic resin, this radially inner portion is deformable radially outwardly. Thus, when pushing force is applied to the cam surfaces of the outer race from the rollers, the radially outer portions of the outer race located radially outwardly of the cam surfaces are radially outwardly displaceable, while radially outwardly deforming the cylindrical member. This absorbs the pushing force applied from the rollers, which in turn makes it possible to form the main body of the casing from a synthetic resin having high rigidity and shock resistance, thereby increasing the life span of the casing.

Alternatively, the casing may comprise radially inner and outer cylindrical portions that are concentric with and radially spaced from each other, and radial ribs extending between and integrally joined to the radially inner and outer cylindrical portions, the radially inner cylindrical portion constituting the radially inner elastic portion of the casing.

With this arrangement, gaps are defined between the radially inner and outer cylindrical portions of the casing, which allows the radially inner cylindrical portion as the radially inner portion of the casing to be radially outwardly deformed. The radial ribs, which extend between and are integrally joined to the radially inner and outer cylindrical portions, ensures strength of the casing in the radial direction, thus making it possible to make the casing from a synthetic resin that is less rigid and/or less shock-resistant.

According to this invention, because the casing has a shock absorbing mechanism, when pushing force is applied to the cam surfaces of the outer race from the rollers, the portions of the outer race located radially outwardly of the respective cam surfaces are radially outwardly displaceable. This reduces the pushing force applied to the outer periphery of the shaft from the rollers, which in turn reduces impressions and fretting wear on the outer periphery of the shaft, thus extending its life.

Also, since the portions of the outer race located radially outwardly of the cam surfaces are radially outwardly displaceable, irrespective of the ambient temperature during use, it is possible to reduce impressions and fretting wear by the rollers even during use of the clutch at normal temperature.

DETAILED DESCRIPTION OF THE PREFERRED EMBODIMENTS

Figure 1:
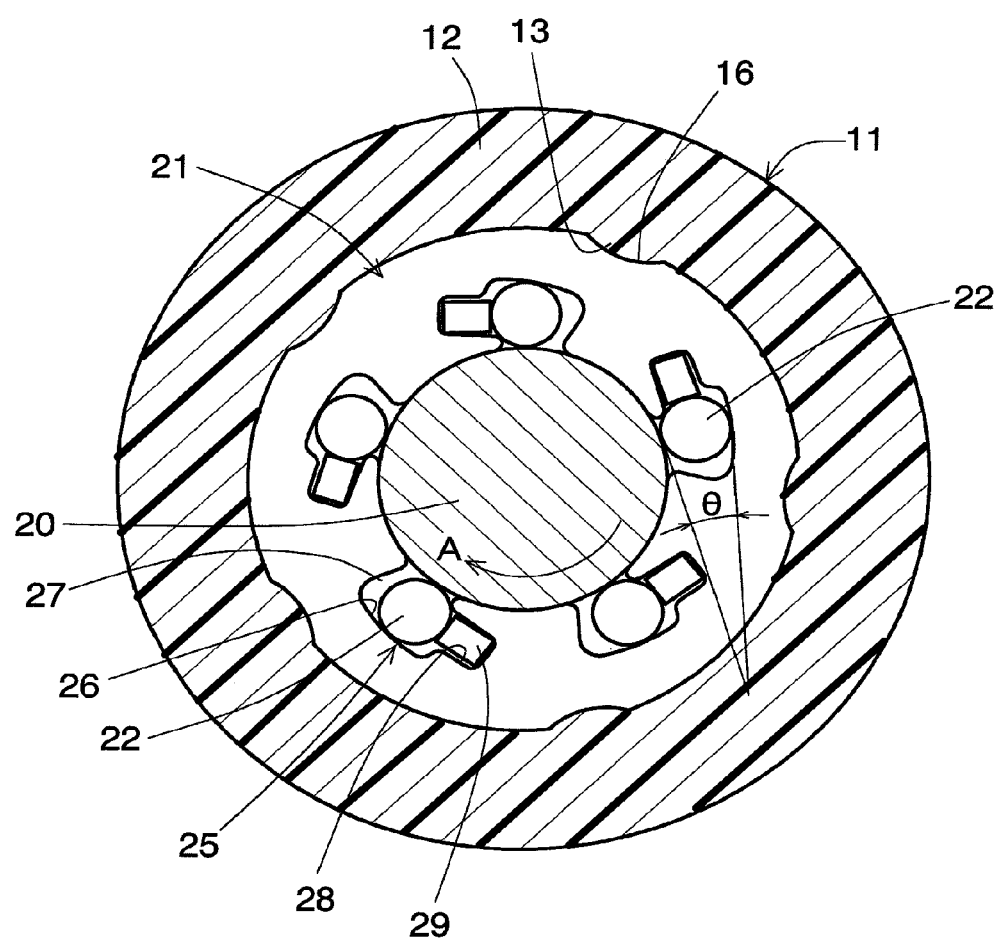
FIG. 1 is a sectional view of a one-way clutch according to a first embodiment.
Figure 2:
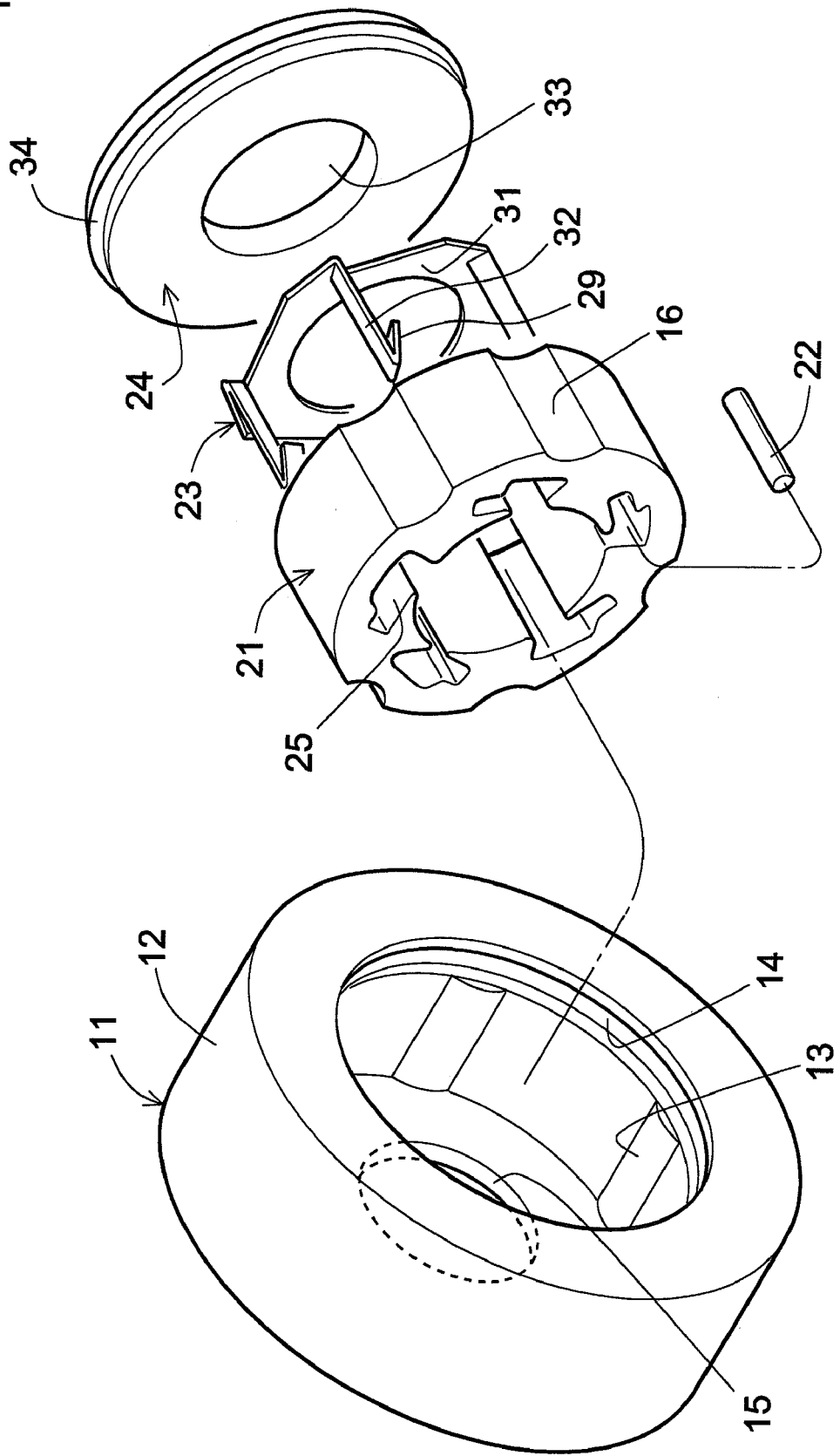
FIG. 2 is an exploded perspective view of the one-way clutch of FIG. 1.

As shown in FIGS. 1 and 2, the one-way clutch of the first embodiment comprises a casing 11, an outer race 21, rollers 22, a spring 23 and a lid 24.

The casing 11 is a cylindrical member having open and closed ends and made of an elastic synthetic resin. The casing 11 has a cylindrical portion 12 having a radially inner surface formed with five axial ribs 13 that are spaced at equal angular intervals. As shown in FIG. 2, a circumferential groove 14 is formed in the radially inner surface of the casing 11 near its open end. A shaft hole 15 is formed in the closed end of the casing 11.

The casing 11 may be made of a glass-fiber reinforced nylon resin, such as "Zytel (Registered Trademark) 80G33HS1L" made by DuPont.

The outer race 21, which is received in the casing 11, is a cylindrical member made of a sintered alloy and has five axial recesses 16 formed in its radially outer surface at angularly equal intervals. The ribs 13 of the casing 11 are fitted in the respective recesses 16 without a clearance therebetween, thereby rotationally fixing the outer race 21 and the casing 11 relative to each other.

As shown in FIG. 1, five pockets 25 are formed in the radially inner surface of the outer race 21 at equal angular intervals to extend the entire axial length of the outer race 21. Cam surfaces 26 are formed on the radially outer surfaces of the respective pockets 25. The cam surfaces 26 are inclined in the same rotational direction to form a wedge angle θ with the shaft 20. A wedge-shaped space 27 having the wedge angle θ is thus defined in each pocket 25.

The rollers 22, which are cylindrical, are inserted in the respective wedge-shaped spaces 27. The spring 23 has spring pieces 29 which are inserted in respective spring recesses 28 defined in the respective pockets 25 so as to communicate with the wide ends of the wedge-shaped spaces 27.

Each pocket 25 has a circumferential width at its radially inner portion that is smaller than the diameter of the rollers 22. This prevents the rollers 22 from radially inwardly coming out of the pockets 25 even before the shaft 20 is inserted through the outer race 21. After the shaft 20 is inserted through the outer race 21, the rollers 22 partially protrude from the radially inner openings of the respective pockets 25 and contact the shaft 20.

As shown in FIG. 2, the spring 23 includes an annular portion 31, and the spring pieces 29, which are each inserted in one of the pockets 25. The spring 23 is formed by bending an elastic metal plate. The annular portion 31 has an inner diameter substantially equal to the inner diameter of the outer race 21. Five base portions 32 extend from respective points of the annular portion 31 arranged along its outer edge at equal angular intervals in the same direction. The spring pieces 29 are formed by bending the free ends of the base portions 32 so as to each extend at a predetermined angle relative to the adjacent spring pieces around the annular portion 31, like a vane wheel.

The spring pieces 29 are inserted into the respective pockets 25 from one end of the outer race 21 until the annular portion 31 abuts the end face of the outer race 21. With the spring 23 thus mounted to the outer race 21, the rollers 22 are inserted into the respective pockets 25 from the opposite end of the outer race 21, while pressing the spring pieces 29.

The lid 24 has a central shaft hole 33 through which the shaft 20 is inserted, and a rib 34 formed on its outer periphery. The lid 24 is mounted to the open end of the casing 11 by engaging the rib 34 in the circumferential groove 14' of the casing 11. The shaft 20 is then inserted through the shaft hole 33 of the lid 24, the outer race 21 and the shaft hole 15 of the casing 11. In this state, the radially inner surface of the outer race 21 is in contact with the outer periphery of the shaft 20.

With the one-way clutch of the first embodiment thus assembled, when the shaft 20 rotates in the direction of the arrow A in FIG. 1 (toward the narrow ends of the respective wedge-shaped spaces 27), the rollers 22 are wedged between the cam surfaces 26 and the outer periphery of the shaft 20. This locks the clutch and torque is transmitted from the shaft 20 to the casing 11. When the shaft 20 rotates in the direction opposite to the direction of the arrow A in FIG. 1, the rollers 22 are moved toward the wide ends of the respective wedge-shaped spaces 27. This unlocks the clutch and the shaft idles, i.e. no torque is transmitted. When the casing 11 is used as an input member and the shaft 20 is used as an output member, too, torque is selectively transmitted from the casing 11 to the shaft 20 in the same manner as when the shaft 20 is an input.

Since the casing 11 is made of an elastic synthetic resin, its radially inner portion is elastically and radially outwardly deformable. Thus, when the clutch is locked and impulsive pushing force is applied to the cam surfaces 26 from the rollers 22, the radially outer portions of the outer race 21 located radially outwardly of the cam surfaces 26 of all the pockets 25 are radially outwardly displaceable, because the radially inner portions of the casing 11 that are in contact with the above-mentioned radially outer portions of the outer race are elastically and radially outwardly deformable.

Thus, the elastic deformation of the radially inner portion of the casing 11 absorbs the pushing force applied to the cam surfaces 26 from the rollers 22. In other words, the radially inner portion of the casing 11 serves as a shock absorbing mechanism for absorbing impulsive pushing force applied to the cam surfaces 26 from the rollers 22.

Since this shock absorbing mechanism of the casing 11 absorbs the pushing force applied to the cam surfaces 26 from the rollers 22, the pushing force applied to the shaft 20 also decreases, which in turn minimizes impressions and fretting wear on the outer periphery of the shaft 20.

Figure 3:
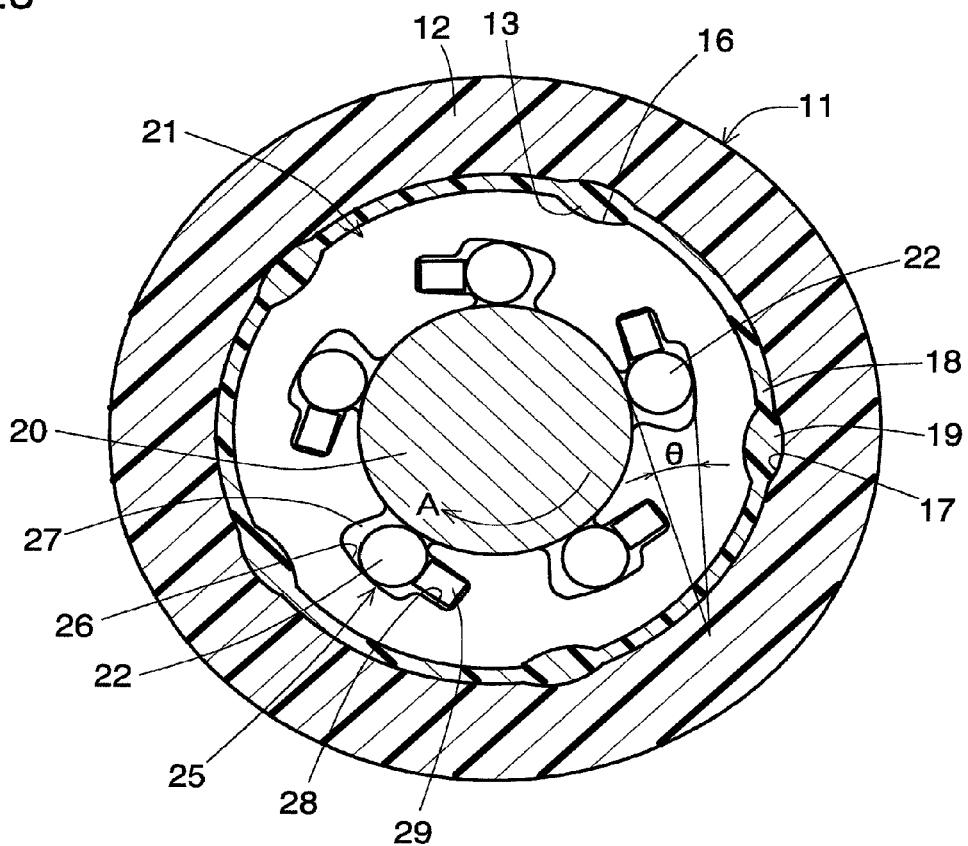
FIG. 3 is a sectional view of a one-way clutch according to a second embodiment.
Figure 4:
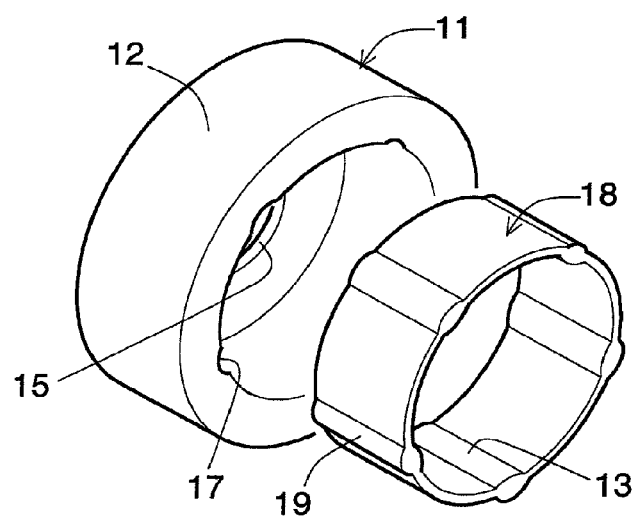
FIG. 4 is an exploded perspective view of a casing of the one-way clutch of FIG. 3.

Now the second embodiment, shown in FIGS. 3 and 4, is described. This embodiment differs from the first embodiment in that the casing 11 comprises a main body made of a synthetic resin and including a cylindrical portion 12 and a cylindrical member 18 made of an elastic synthetic resin and fixedly inserted in the cylindrical portion 12. Otherwise, this embodiment is structurally identical to the first embodiment. Thus, identical elements are denoted by identical numerals, and their description is omitted.

In this embodiment, as shown in FIG. 3, the outer race 21 is fitted in the cylindrical member 18 of the casing 11.

Five equiangularly spaced axial recesses 17 are formed in the radially inner surface of the cylindrical portion 12. The main body of the casing 11 may be made of an elastic synthetic resin, or may be made of any other synthetic resin having high rigidity and shock resistance for increased life span of the casing 11.

The cylindrical member 18 is made of an elastic synthetic resin, and has five equiangularly spaced axial ribs 13 formed on its radially inner surface and five equiangularly spaced axial ribs 19 formed on its radially outer surface and radially opposing the respective ribs 13.

The cylindrical member 18 is fitted in the main body of the casing 11 without play with the ribs 19 engaged in the respective recesses 17. The cylindrical member 18 thus serves as the integral radially inner portion of the casing 11.

The outer race 21 is fitted in the cylindrical member 18 without play with the ribs 13 engaged in the respective recesses 16 of the outer race 21. The outer race 21 is thus rotationally fixed to the main body of the casing 11 through the cylindrical member 18.

Because the cylindrical member 18 is made of an elastic synthetic resin, when the clutch locks and impulsive pushing force is applied from the rollers 22 to the cam surfaces 26, the radially outer portions of the outer race 21 located radially outwardly of the cam surfaces 26 of all the pockets 25 are radially outwardly displaceable, because the radially inner, portions of the cylindrical member 18 that are in contact with the above-mentioned radially outer portions of the outer race are elastically and radially outwardly deformable.

Thus, in the same manner as in the first embodiment, the elastic deformation of the radially inner portion of the cylindrical member 18 absorbs the pushing force applied to the cam surfaces 26 from the rollers 22. In other words, the cylindrical portion 18 serves as a shock absorbing mechanism for absorbing impulsive pushing force applied to the cam surfaces 26 from the rollers 22.

Since this shock absorbing mechanism of the casing 11 absorbs pushing force applied to the cam surfaces 26 from the rollers 22, the pushing force applied to the shaft 20 also decreases, which in turn minimizes impressions and fretting wear on the outer periphery of the shaft 20. If the main body of the casing 11 is made of a synthetic resin having high rigidity and shock resistance, it is possible to increase the life span of the casing 11.

Figure 5:
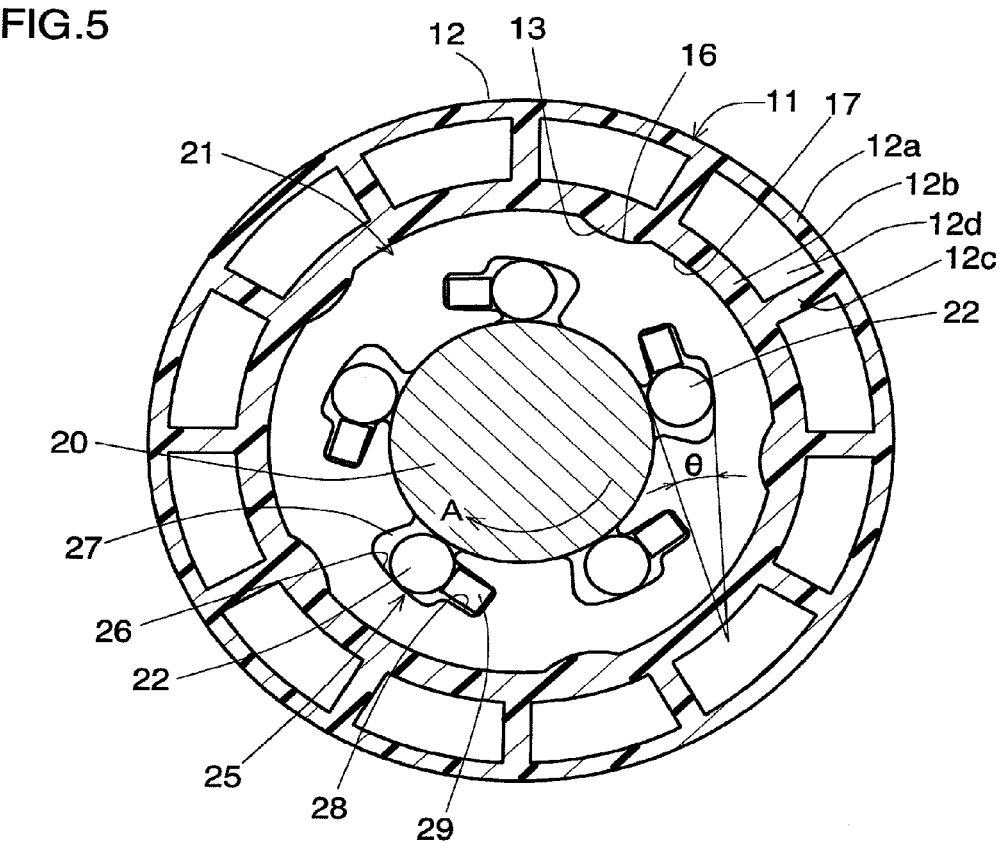
FIG. 5 is a sectional view of a one-way clutch according to a third embodiment.
Figure 6:
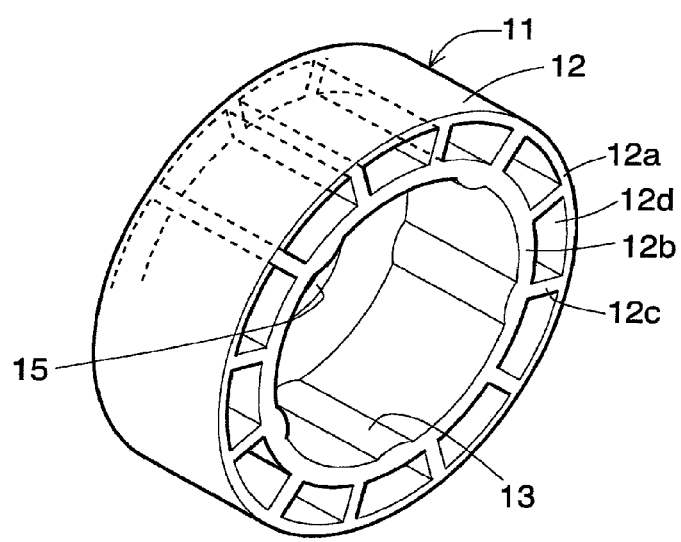
FIG. 6 is a perspective view of a casing of the one-way clutch of FIG. 5.

Next, the third embodiment, shown in FIGS. 5 and 6, is described. This embodiment differs from the first embodiment in that the cylindrical portion 12 of the casing 11 comprises radially inner and outer cylindrical portions 12b and 12a that are concentric with and radially spaced from each other, and radial ribs 12c extending between and integrally joined to the cylindrical portions 12a and 12b. Otherwise, this embodiment is structurally identical to the first embodiment. Thus, identical elements are denoted by identical numerals, and their description is omitted.

In this embodiment, as shown in FIG. 5, the outer race 21 is fitted in the radially inner cylindrical portion 12b.

In this embodiment, spaces 12d defined between the radially inner and outer cylindrical portions 12b and 12a allow radially outward elastic deformation of the radially inner cylindrical portion 12b of the casing 11. Thus, when the clutch locks and impulsive pushing force is applied from the rollers 22 to the cam surfaces 26, the radially outer portions of the outer race 21 located radially outwardly of the cam surfaces 26 of all the pockets 25 are radially outwardly displaceable, because the radially inner cylindrical portion 12b of the casing 11, which is in contact with the above-mentioned radially outer portions of the outer race, is elastically and radially outwardly deformable.

Thus, in the same manner as in the first embodiment, the elastic deformation of the radially inner cylindrical portion 12b absorbs the pushing force applied to the cam surfaces 26 from the rollers 22. In other words, as shown in FIG. 6, the radially inner cylindrical portion 12b of the casing 11 serves as a shock absorbing mechanism for absorbing impulsive pushing force applied to the cam surfaces 26 from the rollers 22.

Since this shock absorbing mechanism of the casing 11 absorbs pushing force applied to the cam surfaces 26 from the rollers 22, the pushing force applied to the shaft 20 also decreases, which in turn minimizes impressions and fretting wear on the outer periphery of the shaft 20. The plurality of ribs 12c, which are formed between and integrally with the radially inner and outer cylindrical portions 12b and 12a, ensure radial strength of the casing 11. This makes it possible to make the casing 11 from a synthetic resin that is less rigid and/or less shock-resistant.

In any of the embodiments, the number of the ribs 13 or 19, recesses 16 or 17, rollers 22, spring pieces 29 or pockets 25 is not limited to five.

The invention claimed is:

1. A one-way clutch comprising a cylindrical casing, an outer race inserted in said casing and having a radially inner surface in which a plurality of pockets are formed at predetermined circumferential intervals, rollers each received in one of said pockets, a shaft inserted through the radially inner surface of said outer race, said pockets having cam surfaces that are inclined in the same rotational direction, thereby defining wedge-shaped spaces having narrow and wide circumferential ends between the respective cam surfaces and the shaft, and springs each received in one of said pockets and biasing the respective rollers toward the narrow circumferential ends of the respective wedge-shaped spaces, wherein said casing is made of a synthetic resin, and includes a shock absorbing mechanism for absorbing shocks produced when said shaft and said outer race rotate relative to each other in one direction and the rollers are wedged between the respective cam surfaces and the outer periphery of the shaft, wherein said shock absorbing mechanism comprises a radially inner elastic portion of said casing, and wherein said casing comprises radially inner and outer cylindrical portions that are concentric with and radially spaced from each other, and radial ribs extending between and integrally joined to said radially inner and outer cylindrical portions, said radially inner cylindrical portion constituting said radially inner elastic portion of said casing.

* * * * *